US006549642B1

(12) United States Patent
Sakurai

(10) Patent No.: US 6,549,642 B1
(45) Date of Patent: Apr. 15, 2003

(54) METHOD AND SYSTEM FOR DETECTING ROAD AREA

(75) Inventor: Kazuyuki Sakurai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/302,451

(22) Filed: Apr. 30, 1999

(30) Foreign Application Priority Data

May 1, 1998 (JP) ............................................ 10-137691

(51) Int. Cl.[7] .................................................. G06K 9/00
(52) U.S. Cl. ........................................ 382/104; 382/170
(58) Field of Search ................................ 382/104, 103, 382/199, 291, 153, 170; 701/300, 301; 340/901, 933, 905, 907, 910, 917, 918, 919, 937, 440

(56) References Cited

U.S. PATENT DOCUMENTS

| | | | |
|---|---|---|---|
| 4,931,937 A | * | 6/1990 | Kakinami et al. .......... 701/300 |
| 5,008,946 A | * | 4/1991 | Ando ......................... 382/104 |
| 5,555,312 A | * | 9/1996 | Shima et al. ............... 382/104 |
| 5,835,614 A | | 11/1998 | Aoyama et al. |
| 5,987,174 A | * | 11/1999 | Nakamura et al. .......... 382/199 |
| 6,053,268 A | * | 4/2000 | Yamada ....................... 180/167 |

FOREIGN PATENT DOCUMENTS

| | | |
|---|---|---|
| JP | 62-079599 | 4/1987 |
| JP | 62-127999 | 6/1987 |
| JP | 63-194477 | 8/1988 |
| JP | 3-118615 | 5/1991 |
| JP | 6-86068 | 3/1994 |
| JP | 06203154 | 7/1994 |

* cited by examiner

Primary Examiner—Timothy M. Johnson
Assistant Examiner—Abolfazl Tabatabai
(74) Attorney, Agent, or Firm—Foley & Lardner

(57) ABSTRACT

In a system for recognizing the environment around a vehicle with an image, to provide a system and method of detecting a road area without lowering the accuracy over the entire of the road area including an upper portion of the road area. The system comprises a computer 100 which is operated under control of a program, an image input device 110, and means for outputting road area data 120. The computer 100 comprises means for calculating statistic for each horizontal line 101, means for fitting the statistic to a function 102, means for processing a threshold value of the road image 103 and means for detecting the road area 104.

11 Claims, 5 Drawing Sheets

METHOD AND SYSTEM FOR DETECTING ROAD AREA

FIELD OF THE INVENTION

The present invention relates to a method and system for detecting a road area and in particular to a system for recognizing the environment around a vehicle by an image processing.

BACKGROUND OF THE INVENTIONS

One of prior art road area detecting systems for recognizing the environment around a vehicle by an image processing is disclosed in, for example, Japanese Patent Kokai Publication No. JP-A-3-118615. The publication proposes an environment recognizing apparatus in a movable vehicle, to which an image of an external environment is input for recognizing the environment. The apparatus comprises an image inputting means for inputting an image in front of the vehicle as serial image signals by scanning the scene of the image in an advancing direction of the vehicle as a substantial main scanning direction of a raster scanning type, and means for detecting the road edge based upon the detection of a change in contrast (or concentration) with respect to the serial image signals.

The configuration of the apparatus is shown in FIG. 5. The environment recognizing apparatus comprises an image input device 501, an initial value memory 502, a comparator 503 and a counter 504.

The conventional environment recognizing apparatus as shown in FIG. 5 operates as follows:

The brightness at a point in a road area in the lower portion of a road image which is input from the image input device 501 is stored in the initial value memory 502 as an initial value. Then, the brightness in another point in the road image is compared with the initial value by the comparator 503. A point having a difference which is not higher than a threshold value is regarded as a point within the road area and is output to the counter 504.

SUMMARY OF THE DISCLOSURE

However, the prior art method which has been described with reference to FIG. 5 has a problem in which the accuracy of detection in the upper portion of the road area is lowered.

The reason resides in that the brightness in the road area is actually changed with the distance from the movable vehicle, that is the vertical coordinate value in the image although the brightness in the road area is assumed to be constant in the prior art method.

Therefore, the present invention has been achieved in view of the above-mentioned problem. It is an object to provide a method and system for detecting the road area which is capable of detecting the road area without lowering the accuracy over the entire of the road area.

In order to achieve the above-mentioned object, there is provided a system for detecting a road area according to claim 1. The system comprises means for inputting an image, means for calculating statistic for each horizontal line, means for fitting said statistic to a function, means for processing threshold value of the road image (termed as "threshold value-processing means"), and means for detecting the road area, whereby detection of a road area which tracks the changes in the vertical coordinate value of the brightness in the road area is conducted based upon the statistic which is calculated for each line by the statistic calculating means.

The means for threshold value-processing of road image includes means for modifying the image based upon the position in the road image prior to the threshold value-processing. The means for threshold value-processing of road image includes means for presetting a threshold value based upon statistic of the image which has not been subjected to the threshold value-processing.

The means for calculating the statistic uses brightness value at a peak in a histogram for each horizontal line as the statistic.

The function fitting means uses an inverse proportional function relating to the vertical coordinate of the image as a function.

Spatial differentiation is effected on an image which has not been subjected to the threshold value-processing and its statistic is used in said means for presetting the threshold value based upon statistic of an image which has not been subjected to the threshold value-processing.

The spatial differentiation is effected on an image which has not been subjected to the threshold value-processing and a threshold value is preset as a linear function of an average value of pixel values in said means for presetting the threshold value based upon statistic of an image which has not been subjected to the threshold value-processing.

According to another aspect of the present invention, there is provided a method of detecting a road area. The method is characterized in that detection of a road area which tracks changes in the vertical coordinate value of the brightness in the road area is conducted based upon statistic which is calculated for each line in a given area in a road image which is input from image input means.

The method of detecting a road area comprises:

(a) calculating statistic of each horizontal line of a road image which is input from image input means, (b) fitting the statistic of each horizontal line to a predetermined model function relating to the vertical coordinate of the image, (c) approximating the statistic of each horizontal line by using said function and processing a threshold value of said road image based upon the difference between its characteristic value and a value of the model function on the vertical coordinate in each pixel of said road image, and (d) detecting a road area from the road image which has been processed with said threshold value.

In a further aspect, the method of detecting a road area comprises the steps of:

(a) inputting a road image from image input means, (b) calculating statistic of the brightness value as a characteristic value for each horizontal line in a predetermined area such as lower area in which the road area occupies a predominant area in the image, (c) fitting the statistic of each horizontal line to a predetermined model function on the vertical coordinate of the road image to approximate the characteristic value of each horizontal line of the road image using this function, (d) calculating the difference between the characteristic value and the value of the model function on said vertical coordinate, (e) modifying the difference between the characteristic value and the value of the model function based upon the position in the image so that value of the difference becomes lower for a pixel having a higher probability that the pixel is in the road area, (f) calculating the statistic of the modified difference over the entire of said road image, (g) presetting a threshold value for said difference value based upon said statistic, (h) converting the difference between the characteristic value and the function value in each pixel into two-valued variable, and (i) cutting out an area which is in the lower portion of the road image as a road area based upon the difference value which is represented by the two-valued variable.

According to a still further aspect of the present invention, there is provided in a system for computer value the environment around a vehicle with an image, a computer usable medium storing thereon a program for functioning the system. The system is characterized by:

(a) means for calculating statistic for each horizontal line of a road image which is input from image input means, (b) means for fitting said statistic to a function, (c) means for processing a threshold value of said road image by using said function value, and (d) means for detecting a road area from the road image which has been processed with said threshold value.

More specifically, there is provided a medium storing thereon a program for executing in a computer the steps of:

(a) inputting a road image from image input means, (b) calculating statistic of the brightness value as a characteristic value for each horizontal line in a predetermined area such as lower area in which the road area occupies a predominant area in the image, (c) fitting the statistic of each horizontal line to a predetermined model function in the vertical coordinate of the road image to approximate the characteristic value of each horizontal line of the road image using this function, (d) calculating the difference between the characteristic value and value of the model function in said vertical coordinate, (e) modifying the difference between the characteristic value and the value of the model function based upon the position in the image so that value of the difference becomes lower for a pixel having a higher probability that the pixel is in the road area, (f) calculating the statistic of the modified difference over the entire of said road image, (g) presetting a threshold value for said difference value based upon said statistic, (h) converting the difference between the characteristic value and the function value in each pixel into two-valued variable, and (i) cutting out an area which is in a lower portion of the road image as the road area based upon the difference value which is represented by the two-valued variable.

PREFERRED EMBODIMENTS OF THE INVENTION

Now, a mode of embodying the present invention will be described in more detail with reference to the drawings.

Figure 1:
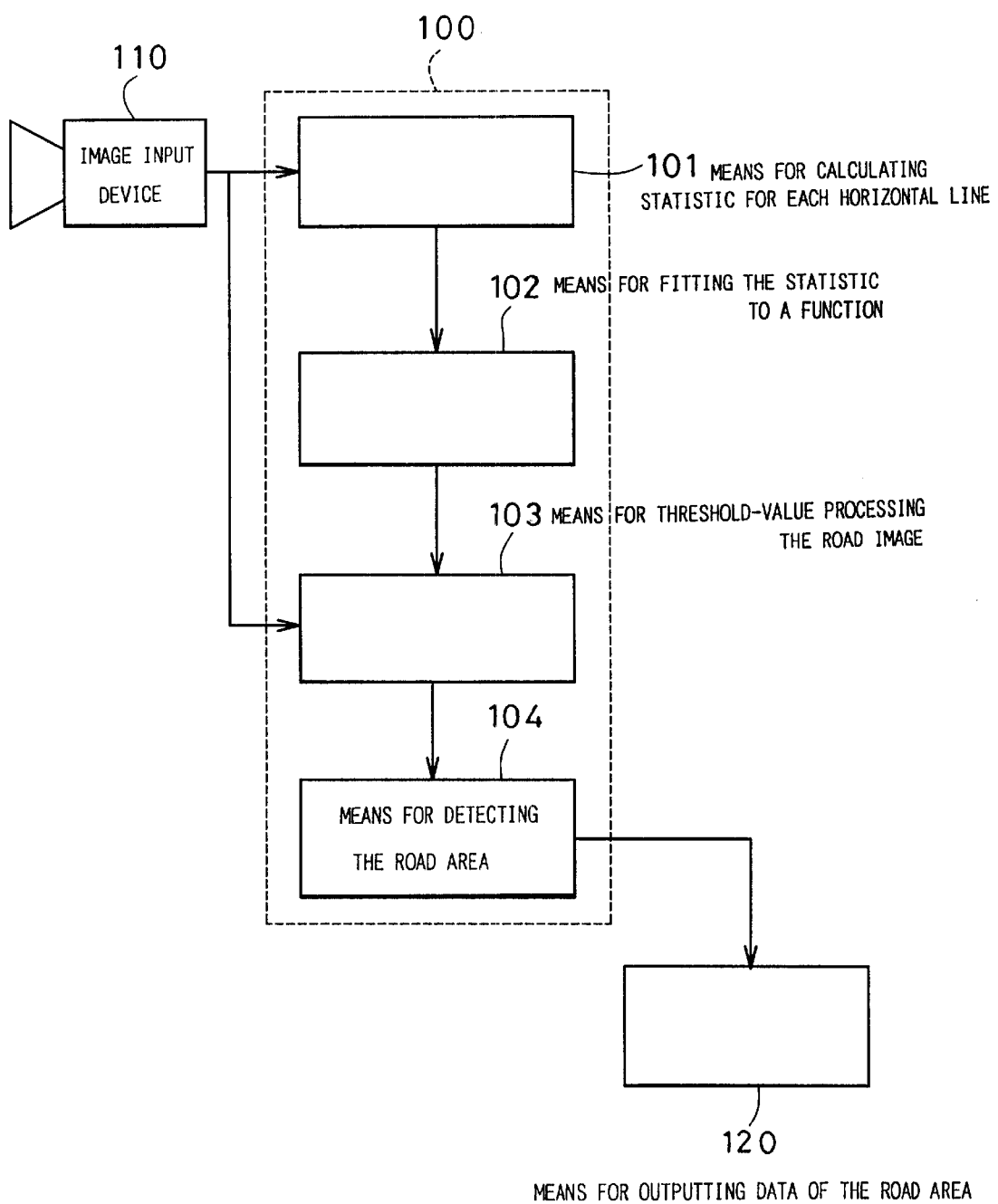
FIG. 1 is a block diagram showing a configuration of one embodiment of the present invention.

FIG. 1 is a view showing the configuration of one embodiment of the present invention. Referring now to FIG. 1, one embodiment of the present invention comprises a data processing unit (computer, processor) 100 which is operated under control of a program, an image input device 110 including a CCD camera and the like, and means for outputting road area data.

The data processing unit 100 comprises means for calculating a statistic of each horizontal line 101, means for fitting the statistic to a function 102, means for processing a threshold value of the road image 103 and means for detecting the road area 104.

These means have their functions which are implemented by the programs which are executed by the data processing unit 100. These means are generally operated as follows:

The means for calculating a statistic of each horizontal line 101 is adapted to calculate a statistic of a characteristic value of the image for each horizontal line in a given area of the input road image.

The means for fitting the statistic to a function 102 is adapted to fit the above-mentioned statistic to a function related with the vertical coordinate of the image.

The means for threshold value-processing the road image 103 is adapted to threshold value-process the road image with a threshold value based upon the above-mentioned function.

The means for detecting the road area 104 is adapted to detect the road area from the road image which has been processed with the threshold value.

Figure 2:
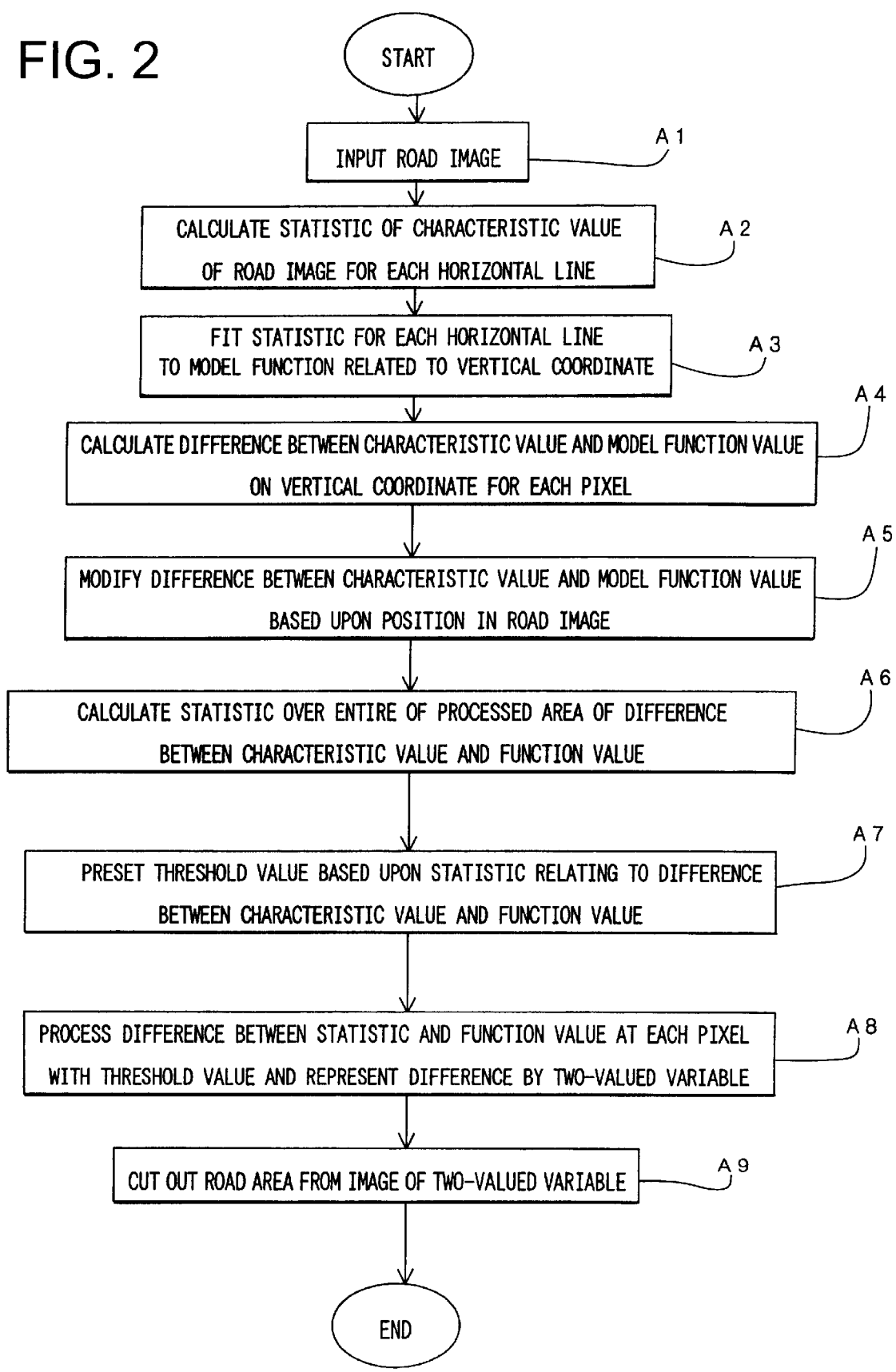
FIG. 2 is a flow chart showing a process flow in one embodiment of the present invention.

FIG. 2 is a flow chart showing the flow of processing in one embodiment of the present invention. The entire operation in one embodiment of the present invention will be described in detail with reference to the view of FIG. 1 and a flow chart of FIG. 2.

Now, an image of the road is input by the image input device 110 (step A1 in FIG. 2).

Then a characteristic value (for example, a statistic of the brightness value, an averaged value, peak value in case of plotting a histogram) in a predetermined area in the road image to be processed by the means for calculating the statistic of each horizontal line 101, for example, in the lower portion of the image which is considered that the road area occupies a predominant area in the image (refer to 302 in FIG. 3) is calculated for each horizontal line (step A2).

Figure 3:
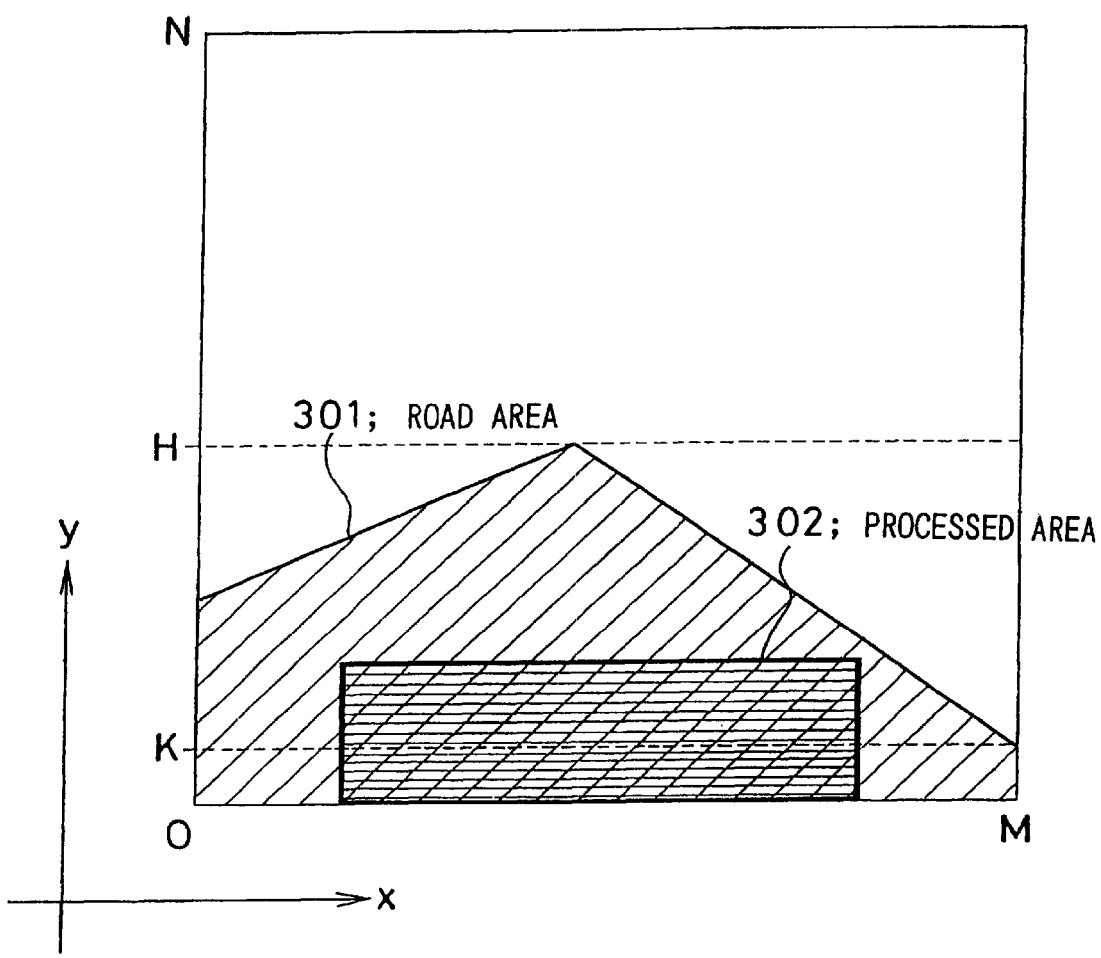
FIG. 3 is a view explaining a mode of embodying the present invention by schematically illustrating the road image.

Then a predetermined model function for the vertical coordinate of the image, that is y-coordinate in FIG. 3 is applied to the statistic for each of the above-mentioned horizontal line for approximating the characteristic value for each horizontal line by this function (step A3).

Then the difference between the characteristic value and a value of the model function in the y coordinate in interest is calculated for each pixel of the road image (step A4).

The difference between the characteristic value and the value of the model function is modified based upon the position in the image so that the value of the difference is smaller or less for a pixel having a higher probability that the pixel is in the road area (step A5).

The statistic is calculated over the entire of the image of the value of the modified difference (step A6), and a threshold value of the difference value is preset based upon the statistic (step A7).

Then the value of the difference is converted into two-valued variable (e.g., digital signal) based upon the above-mentioned threshold value (step A8), and finally the area which is located in the lower portion of the image is cut out as the road area based upon the difference represented by two-valued variable (step A9).

Then operation and advantage of one embodiment of the present invention will be described.

Since the characteristic value of the road area is determined for each horizontal line and the value is approximated by using a model function concerning with y-coordinate (vertical coordinate) in one embodiment of the present invention, estimation of the characteristic value of the road area considering the change in the characteristic value of the road area in the y coordinate is conducted. Accordingly, the road area can be detected without lowering the accuracy over the entire of the road area including the upper portion of the road area.

EMBODIMENT

Figure 4:
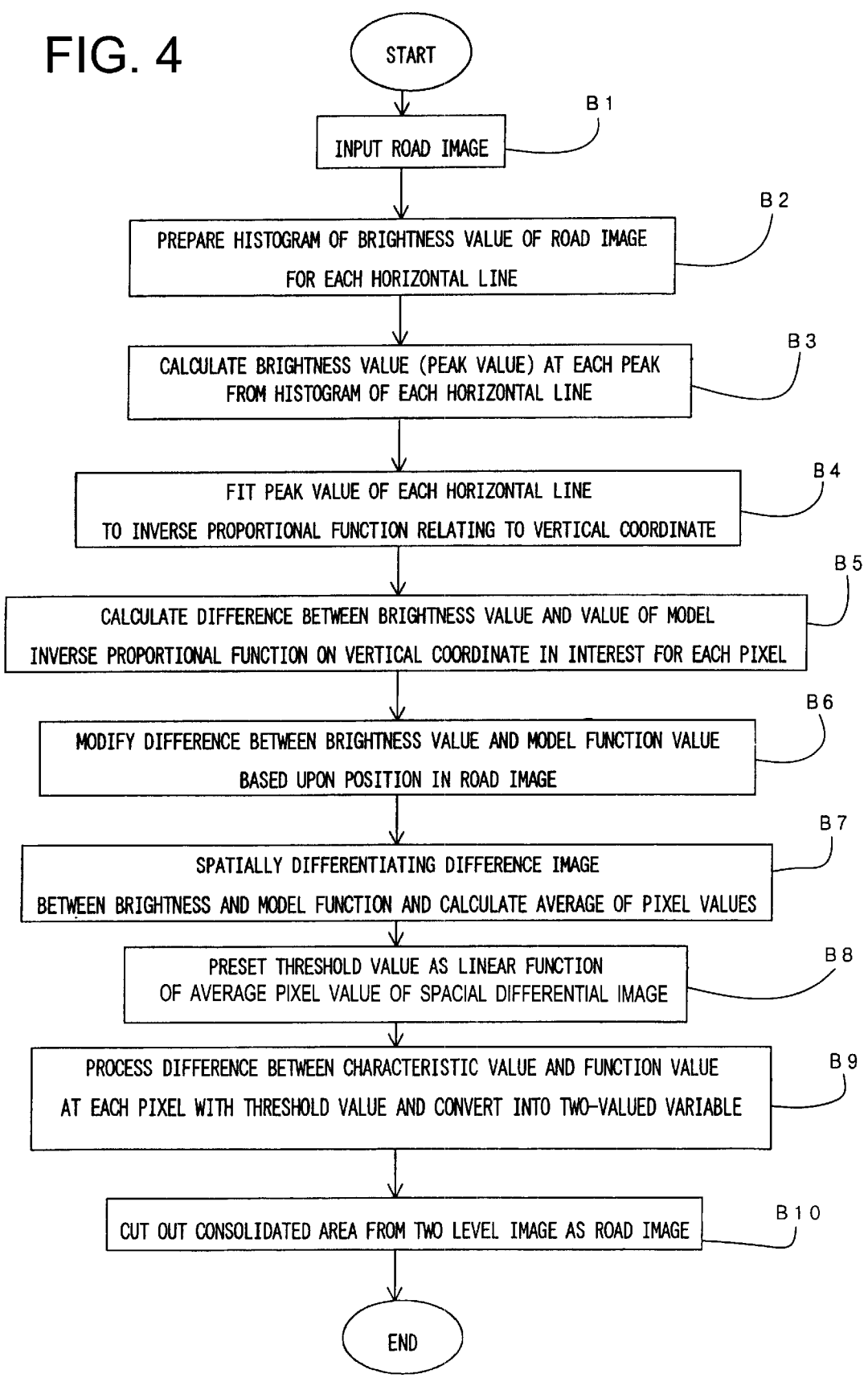
FIG. 4 is a flow chart showing a process flow in one embodiment of the present invention.
Figure 5:
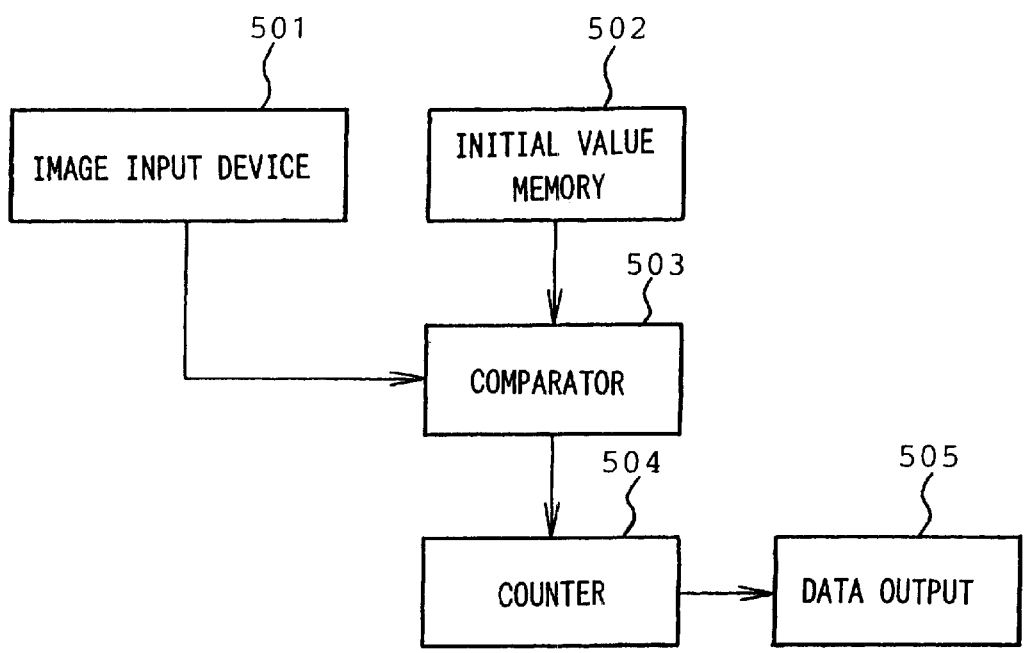
FIG. 5 is a view showing the configuration of a prior art apparatus.

Now, operation will be described by way of detailed embodiment for describing the mode of embodying the present invention in more detail. FIG. 4 is a flow chart explaining the flow of processing in one embodiment of the present invention.

Firstly, a road image is input by the image input device 110 (step B1 in FIG. 4).

Then, a histogram of the brightness value which is one of the characteristic values is prepared for each horizontal line in the lower portion of the image in which it is considered that the road area predominantly occupies the road image, for example, an area (302 in FIG. 3) in which right and left opposite margins are cut out in one third of the lower part of the image (step B2). The brightness value at a peak in the histogram (referred to as peak value) is calculated for each horizontal line based upon the prepared histogram (step B3).

The peak value for each horizontal line is fitted to the model function which is an inverse proportional function relating to y-coordinate in FIG. 3 (step B4).

This can be conducted by the least squares fitting method of each peak value and the model function value. The robustness can be enhanced by using the weighted least squares method using the degree of each peak value in the histogram as a weight when the fitting using this method of least squares is conducted. The brightness value is approximated for each horizontal line by this function.

The difference between the brightness value and the value of the model function in the y-coordinate concerned in each pixel of the road image is calculated (step B5).

This difference between the brightness value and the value of the model function is modified based upon the position in the image so that it is smaller or less for the pixel having a higher probability that the pixel is in the road area (step B6).

This modification is conducted by diving the difference between the characteristic value and the value of the model function in each pixel having coordinate values (x, y) with the variables B (x, y) by using parameters K, H, M, N and an upper limit L of gradation.

$$\begin{aligned}B(x, y) &= 2Kx/M + L - K & \text{if } x \leq M/2, y = K\\ &= 2K(M - x)/M + L - K & \text{if } x > M/2, y = K\\ &= (2K(M - x)/M + L - K) & (H - y)/(H - K)\\ &\quad \text{if } x \leq M/2, H > y > K\\ &= (2K(M - x)/M + L - K) & (H - y)/(H - K)\\ &\quad \text{if } x > M/2, H > y > K\\ &= 1 \text{ if } y \geq H\end{aligned}$$

A spatially differentiated image of the value of the modified difference (difference image) is formulated and an average value of the pixel values is calculated (step B7).

A threshold value for converting the difference image into two-values variable as a linear function of the averaged pixel values is preset (step B8). At this time, the threshold value is determined such that it increases as the averaged pixel value of the differentiated image decreases.

Then, the difference image is converted into two-values variable (two-leveled signal) based upon the above-mentioned threshold value (step B9). Finally, a connected area which is located in the lower portion of the image is cut out from the difference image represented by tow-leveled signals as the road area (step B10).

The meritorious effect of the invention is summarized as follows.

As mentioned above, an advantage is obtained that the road area can be detected without lowering the accuracy over the entire of the road area.

The reason resides in that the detection of the road area which tracks the changes in the vertical coordinate of the brightness in the road area is conducted based upon the statistic calculated for each horizontal line.

It should be noted that other objects of the present invention will become apparent in the entire disclosure and that modifications may be done without departing the gist and scope of the present invention as disclosed herein and appended herewith.

Also it should be noted that any combination of the disclosed and/or claimed elements, matters and/or items may fall under the modifications aforementioned.

What is claimed is:

1. In a system for recognizing the environment around a vehicle with an image, a system for detecting a road area wherein said system comprises means for calculating a statistic for each horizontal line of a road image which is input from an image input device, means for fitting said statistic to a function related to a vertical coordinate of the road image, threshold value-processing means for processing a threshold value of said road image by using said function, means for detecting the road area from the road image which has been subjected to threshold value-processing by said threshold value-processing means, and wherein said function fitting means uses an inverse proportional function relating to the vertical coordinate of the road image as said function.

2. A system for detecting a road area as defined in claim 1 wherein said threshold value-processing means includes means for modifying the image based upon a position in the road image prior to said threshold value-processing.

3. A system for detecting a road area as defined in claim 1 wherein said threshold value-processing means includes means for presetting a threshold value based upon a statistic of an image which has not been subjected to the threshold value-processing.

4. A system for detecting a road area as defined in claim 3 wherein spatial differentiation is effected on said image which has not been subjected to the threshold value-processing and its statistic is used in said means for presetting the threshold value.

5. A system for detecting a road area as defined in claim 3 wherein spatial differentiation is effected on said image which has not been subjected to the threshold value-processing and a threshold value is preset as a linear function of an average value of pixel values in said means for presetting the threshold value.

6. A system for detecting a road area as defined in claim 1 wherein said means for calculating the statistic uses a brightness value at a peak in a histogram for each horizontal line as the statistic.

7. A method of detecting a road area comprising:

providing a road image comprising a road area therein, and detecting the road area in said road image, wherein detecting of the road area tracks changes in the vertical coordinate value of the brightness in the road area based upon a statistic which is calculated for each line in a given area in the road image which is input from image input means, and further comprising the step of:

fitting the statistic to an inverse proportional function relating to the vertical coordinate of the road image.

8. A method of detecting a road area comprising:

(a) calculating a statistic of each horizontal line of a road image which is input from an image input device, (b) fitting the statistic of each horizontal line to a predetermined inverse proportional model function relating to the vertical coordinate of the image, (c) approximating the statistic of each horizontal line by using said function and processing a threshold value of said road image based upon the difference between its characteristic value and a value of the model function on the vertical coordinate in each pixel of said road image, and (d) detecting a road area from the road image which has been processed with said threshold value.

9. A method of detecting a road area wherein the method comprises the steps of:

(a) inputting a road image from an image input device, (b) calculating a statistic of the brightness value as a characteristic value for each horizontal line in a predetermined area in which the road area occupies a predominant area in the image, (c) fitting the statistic of each horizontal line to a predetermined inverse proportional model function on the vertical coordinate of the road image to approximate the characteristic value of each horizontal line of the road image using the function, (d) calculating the difference between the characteristic value and the value of the model function on said vertical coordinate, (e) modifying the difference between the characteristic value and the value of the model function based upon the position in the image so that value of the difference becomes lower for a pixel having a higher probability that the pixel is in the road area, (f) calculating the statistic of the modified difference over the entirety of said road image, (g) presetting a threshold value for said difference value based upon said statistic, (h) converting the difference between the characteristic value and the function value in each pixel into two-valued variable, and (i) cutting out an area which is in a lower portion of the road image as a road area based upon the difference value which is represented by the two-valued variable.

10. In a system for recognizing the environment around a vehicle with an image, a computer usable medium storing thereon a program, which, when executing in a computer includes:

(a) means for calculating a statistic for each horizontal line of a road image which is input from an image input device, (b) means for fitting said statistic to an inverse proportional function related to a vertical coordinate of the road image, (c) means for processing a threshold value of said road image by using said function value, and (d) means for detecting a road area from the road image which has been processed with said threshold value.

11. A medium storing thereon a program for executing in a computer, and when executing on said computer performs the steps of:

(a) inputting a road image from an image input device, (b) calculating statistic of the brightness value as a characteristic value for each horizontal line in a predetermined area such as a lower area in which the road area occupies a predominant area in the image, (c) fitting the statistic of each horizontal line to a predetermined inverse proportional model function in the vertical coordinate of the road image to approximate the characteristic value of each horizontal line of the road image using said function, (d) calculating the difference between the characteristic value and value of the model function in said vertical coordinate, (e) modifying the difference between the characteristic value and the value of the model function based upon the position in the image so that value of the difference becomes lower for a pixel having a higher probability that the pixel is in the road area, (f) calculating the statistic of the modified difference over the entirety of said road image, (g) presetting a threshold value for said difference value based upon said statistic, (h) converting the difference between the characteristic value and the function value in each pixel into two-valved variable, and (i) cutting out an area which is in a lower portion of the road image as road area based on upon the difference value which is represented by the two-valved variable.

* * * * *